United States Patent [19]

Porter et al.

[11] Patent Number: 4,713,841
[45] Date of Patent: Dec. 15, 1987

[54] SYNCHRONOUS, ASYNCHRONOUS, DATA RATE TRANSPARENT FIBER OPTIC COMMUNICATIONS LINK

[75] Inventors: David R. Porter, Roanoke; James H. Bowen, Salem; John M. Holland, Shawsville, all of Va.

[73] Assignee: ITT Electro Optical Products, a division of ITT Corporation, Roanoke, Va.

[21] Appl. No.: 740,151

[22] Filed: Jun. 3, 1985

[51] Int. Cl.$^4$ .............................. H04B 9/00
[52] U.S. Cl. ............................ 455/608; 375/22; 455/619
[58] Field of Search ............ 455/608, 619, 606, 607, 455/601, 617; 375/22, 98; 307/266, 267; 330/10

[56] References Cited

U.S. PATENT DOCUMENTS

| 3,176,238 | 3/1965 | Dickerson, Jr. | 455/234 |
| 4,027,152 | 5/1977 | Brown et al. | 455/608 |
| 4,581,731 | 4/1986 | Tomikashi et al. | 455/619 |

OTHER PUBLICATIONS

O'Neill, "Fiber Optic Receiver"-EDN, Jun. 20, 1979, vol. 24, #12, p. 158.

Primary Examiner—Joseph A. Orsino, Jr.
Attorney, Agent, or Firm—Robert A. Walsh; Mary C. Werner

[57] ABSTRACT

An optical fiber communications link which by means of pulse-width-modulation (PWM) encoding supports either synchronous or asynchronous data transmission and operation over a wide range of data rates. The link utilizes a PWM encoder which accepts either synchronous (clock plus data) or asynchronous (data only) binary inputs and generates a PWM encoded waveform. This waveform is transmitted via an optical transmitter, optical channel (e.g., fiber optics) and optical receiver to the PWM decoder which reconstructs the binary inputs. The optical receiver contains a receiver circuit for assuring automatic gain control regardless of the duty cycle. In the synchronous mode of operation the unsymmetrical clock output is restored to symmetry by using a clock symmetry restoration technique.

9 Claims, 7 Drawing Figures

SYNCHRONOUS, ASYNCHRONOUS, DATA RATE TRANSPARENT FIBER OPTIC COMMUNICATIONS LINK

This application is copending with U.S. applications Ser. No. 740,149 and 740,150, both filed June 3, 1985. U.S. application Ser. No. 740,149 claims the clock symmetry restoration circuit described in this application and U.S. application Ser. No. 740,150 claims the optical fiber communications system described in this application.

BACKGROUND OF THE INVENTION

Many fiber optic links have been designed for transmission of synchronous or asynchronous data. However, very few designs have been developed which are efficient at operating in either mode and also operate over a wide range of data rates. Asynchronous links do not have the requirement for transmitting clock along with the data. The data may be of a type which does not require clock or the clock is embedded into the data by the host equipment and is inconsequential to the transmission equipment. Asynchronous links are typically simple in design and do not provide a capability for accepting and transmitting a clock containing relative timing information along with the data. The military designated AN/FAC-2B is a good example of an asynchronous fiber optic link. This link accepts a binary asynchronous input signal and produces the same signal at the output; of course, some distortion will occur due to noise and other factors.

Synchronous links have the requirement for accepting both data and clock input signals and generating both of these signals at the output. The positive and negative transitions of the clock signal indicate the beginning/ending and center of the data bit period. Thus, the clock signal may be used to sample the binary state of the data signal at the optimum time; i.e., center of the eye pattern. A common practice in the design of synchronous links is to embed clock into the transmitted bit stream by encoding the data. Commonly used codes are Manchester, Miller, and block codes. Link designs which use these codes are very effective, but generally require that the data rate for a specific link be constant. If the data rate is constant, the link design is greatly simplified. For example, clock is easily recovered using a phase-lock-loop circuit whose natural center frequency is selected to be twice the data rate. An obvious disadvantage of the phase-lock-loop circuit is the necessity for hardware changes to change data rate. Some applications require that synchronous data links have data rate transparency; i.e., they must operate over a range of data rates without hardware changes. "Bit synchronizers" which possess sufficient intelligence to adapt to the received data rate are one solution; however, clock acquisition time may be long, the equipment is expensive and historically has resulted in reduced reliability. An alternative solution is to transmit data and clock separately via two optical wavelength channels over a single fiber. The military designated AN/-FAC 3 uses this approach. Problems with the wavelength division multiplex approach are component availability, loss associated with the multiplex and demultiplex couplers, and the high cost of the couplers and dual transmitters and receivers.

With regard to the receiver of the present invention, its design must take into consideration the characteristics of the optical system of the invention. Ideally, the carrier in such systems could be simply modulated in amplitude in response to the data. Unfortunately, there are serious trade-offs involved in the design of such systems.

The most fundamental of these trade-offs is between system simplicity and performance. If a sufficient amount of signal is available at the receiver of a link, a simple receiver may suffice. It is however, usually desirable that the system have as long a possible range between the transmitter and receiver as practical. Since the availability of optical emitters (LEDs and laser diodes) sets relatively well defined limits on the level of optical power that can be launched into the fiber, it is desirable to make the receiver as sensitive as possible. Furthermore, since the total amount of data that can be transferred over the link in any given amount of time is proportional to the data rate capacity of the system, it is also desirable that the receiver have a high bandwidth. One way of rating an optical link is thus a "performance factor" which is the product of the data rate and the maximum distance between the transmitter and receiver of the link.

The responsivity of PIN diode optical detectors is usually between 0.5 and 0.8 Amperes per watt of incident radiation. In order to achieve the highest possible data rate for the system, it is desirable to minimize the geometry of the detector (thus reducing capacitance), and the fiber (thus reducing dispersion). Unfortunately, reducing the diameter of the fiber limits the amount of light that can be launched into it. Furthermore, the geometry of the detector must be sufficient to capture all of the light available from the fiber.

The end result of such conflicting requirements is that the electronics of the receiver must work with extremely small, high frequency, optical signals if the system is to have the best possible data through-put. This fact in turn means that the electronic amplifiers of the receiver must be wide bandwidth, must exhibit very low levels of internally generated noise (especially in the first stages), and must be capable of working with extremely low input currents. Unfortunately, the bias currents in such wideband amplifiers are subject to long term drift due to thermal and aging effects. Since this drift is often many times larger than the desired detection level of the receiver, it is not practical to build an optical receiver that has a true DC (0 Hz) low end bandpass, and that at the same time exhibits a high performance factor.

In order to have a receiver exhibit an apparent DC (or very low frequency) low end bandpass frequency, many techniques have been used in the prior art. All such techniques change the format of the data in some way in order to accomplish this. Most of these schemes are based on two basic approaches: state encoding, and transition encoding.

In a state encoding system, the logical state of the data at the input of the transmitter is encoded and transmitted to the receiver. The receiver acts on such data by setting its data output to the decoded level (a logical 1 or 0). State encoding has the advantage that the link is kept busy with data, even when the input to the transmitter is in a constant state. This continuous activity makes timing synchronization (clock recovery) and automatic gain control (AGC) at the receiver relatively simple to accomplish.

The disadvantage of state encoding systems is that such systems are not totally data rate transparent. If the system clock is available to the encoder of the transmitter, and if it is in the frequency lock range of the receiver, these systems can transfer data with almost perfectly reproduced timing. For systems that do not have such clock information available, the transmitter must "over sample" the input data stream. Thus a jitter is introduced onto the data edges that is proportional in peak value to the sampling interval. The higher the ratio of optical transmission rate to data rate, the less the induced relative jitter, but the greater the wasted transmission bandwidth.

Because of these problems with state encoding, transition encoding has a great deal of appeal. In such a system, optical transmissions need only be made when a "transition event" occurs. Since transmissions are synchronized to these events, timing jitter is not induced into the data. As an additional advantage, the optical emitter is not made to dissipate as much power at low data rates. Thus power is conserved and the emitter reliability is increased.

The problem that has kept transition encoding from being used more widely is directly associated with the wide range of optical pulse densities. When the input to such a system is not changing rapidly, very little information is available to the receiver. This means that the receiver must be able to control its gain (AGC) in a smooth and predictable manner, with only sparse and irregular pulses of light to measure. Furthermore, the receiver must be able to track the extremes of such optical pulses in order to set a detection threshold at half way between the minimum and maximum amplitudes. These thresholds must thus be detected in extremely short intervals, but maintained for long periods. Additionally, it is necessary for these thresholds to track swiftly when more transition data is present. If these capabilities cannot be accomplished adequately, the receiver will exhibit cross coupling between data rate and sensitivity, or may be completely unstable under certain signal conditions.

In the prior art, AGC detection and clamping have usually been done with simple detection diodes that charge capacitors. In such circuits, a high impedance amplifier is then used to sense the voltage across the capacitor. The voltage stored in a capacitor is proportional to the charging current and the charge time (more properly it is proportional to the integral of the current over time.) Therefore, to maximize the hold time to charge time ratio, it has been necessary to minimize the charging impedance, and to maximize the discharging impedance in the circuit, thereby increasing the charging current and minimizing the discharging current. The use of very low forward resistance diodes (or active detectors) in the charge circuit, and very high impedance sense amplifiers in the discharge circuit can optimize such a circuit, but only within limits imposed by device characteristics. In the present invention time amplification or the stretching of pulses is used to solve this problem. This is possible because the charge in the capacitor is proportional to both current and time.

With regard to the clock symmetry restoration circuit of the present invention, prior art circuits for recovery of clock and data use either a ringing tank or a phase-locked loop.

The ringing tank approach uses a tuned circuit (tank) which is tuned to a frequency equal to (or an integral multiple of) the data rate. The tank is excited by the transitions of the incoming data, which are differentiated and applied as short pulses to the tank. The output of the tank is a sinusoidal waveform which decays slowly between data transitions. The sinusoidal waveform is converted to a square wave digital clock signal by a comparator (and frequency divider, if the tank is tuned to a multiple of the data rate). The clock signal is used to sample the incoming data in a D-type flip-flop.

The phase-locked loop (PLL) approach uses a voltage-controlled oscillator (VCO), phase detector, and loop filter to produce a clock signal locked to the data rate (or an integral multiple thereof). The phase detector samples the phase of the output signal from the VCO (or from a frequency divider circuit, if an integral multiple is used) at the times of the transitions of the incoming data. The phase information is filtered by the loop filter and fed to the VCO to control its frequency in a manner such that the phase of the output signal stays locked to the data transitions. The output clock signal from the VCO (or frequency divider) is used to sample the incoming data in a D-type flip-flop.

The aforementioned ringing tank and PLL approaches suffer from a limitation on the range of data rates they will tolerate for proper circuit operation.

The ringing tank must be rather precisely tuned to the data rate, or else phase error in the recovered clock will be excessive. The ringing tank is normally used only for fixed data rate transmission. If the ringing tank is to be applied to a range of data rates, some means for tuning and/or bandswitching must be provided. This requires either a manual adjustment which must be changed each time the data rate is changed, or a complex automatically adaptive tuning and bandswitching arrangement.

The PLL is automatically adaptive to data rate over a limited range, but has difficulty spanning many octaves without some additional means of tuning and/or bandswitching. If the range of data rate spans more than one octave, the possibility exists of improperly locking to undesired harmonics of the data rate. Additional circuitry is required to detect and correct for this condition. In addition, if many octaves are to be spanned, it is very difficult to build a VCO with the necessary combination of tuning range and frequency stability. The closed-loop response must also be a compromise design, less than optimum at most frequencies, because of the large variation in loop gain between the ends of the frequency range. Bandswitching approaches are also not attractive because they don't allow the clock recovery circuit to continuously track a signal which is smoothly changing in frequency from one band to another.

SUMMARY OF THE INVENTION

It is an object of the present invention to provide a fiber optic communications system capable of both synchronous and asynchronous operation over a wide range of data rates.

It is a further object of the present invention to provide such a system which does not require hardware changes for operation at different data rates, does not require optical couplers, and utilizes a single optical wavelength.

The above objects are achieved by providing a fiber optic communication system which utilizes a pulse width modulation encoder which accepts either synchronous or asynchronous binary inputs and generates a PWM encoded waveform. Data with or without clock is transmitted through the PWM encoder to an optical transmitter comprising a light emitting diode which transmits a light signal through an optical fiber to an optical receiver which comprises a PIN photodetector diode. Data with or without asymmetrical clock is recovered after the signal passes through a pulse width modulation decoder. Symmetrical clock is recovered through a clock symmetry restoration circuit connected to the output of the PWM decoder. An important functional aspect of the design is that a single switch selects the mode of operation at each end of the link.

It is another object of the present invention to provide a receiver in the system capable of assuring automatic gain control regardless of the duty cycle.

The above object is attained by providing a receiver circuit having a PIN-FET transimpedance front end, and a balanced amplifier chain. The circuit is constructed so as to exhibit stable automatic gain control characteristics on signals with extremely small duty factors (1:25,000). This is accomplished by the use of an adaptive one-shot combined with a charge pump and a peak follower. The receiver has both an analog output and an ECL digital data output. In addition, the receiver has a built-in test equipment (BITE) output that provides a digital signal when the received data is too weak for reliable operation.

It is still another object of the present invention to provide a circuit for converting an unsymmetrical receiver clock output to a symmetrical clock output.

The above object is attained by providing a clock symmetry restoration circuit connected to the asymmetrical clock output of the system's optical receiver wherein a voltage controlled monostable multivibrator stretches the assymmetrical clock pulses into a 50% duty cycle clock waveform as follows.

In this invention, the positive-going data transitions produce narrow pulses which trigger the voltage-controlled monostable multi-vibrator (one-shot). The one-shot is capable of operation over a very wide range of pulse widths, as determined by the value of the control voltage. The output of the one-shot stretches the input pulses into a 50% duty-cycle clock waveform. The 50% duty cycle is forced by additional circuitry as follows. The one-shot output drives buffers which produce inverted and non-inverted (complementary) replicas of the waveform. These signals drive an integrator which produces a dc output voltage whose rate of change is proportional to the difference in average values of the complementary signals. The integrator output voltage is the control voltage for the pulse width of the one-shot. Thus, the integrator adjusts the pulse width until the complementary waveforms are both 50% duty cycle. Since the one-shot is capable of producing a very wide range of pulse widths, the circuit can produce a 50% duty-cycle recovered clock waveform over a frequency range of greater than 17 octaves with no manual adjustments. Since no bandswitching is used, the circuit can smoothly track a signal which is varied over the full frequency range. The NRZ data is recovered over the full frequency range by means of a delay line and flip-flop, followed by another flip-flop which retimes the data by means of the recovered clock.

DETAILED DESCRIPTION OF THE INVENTION

Figure 1:
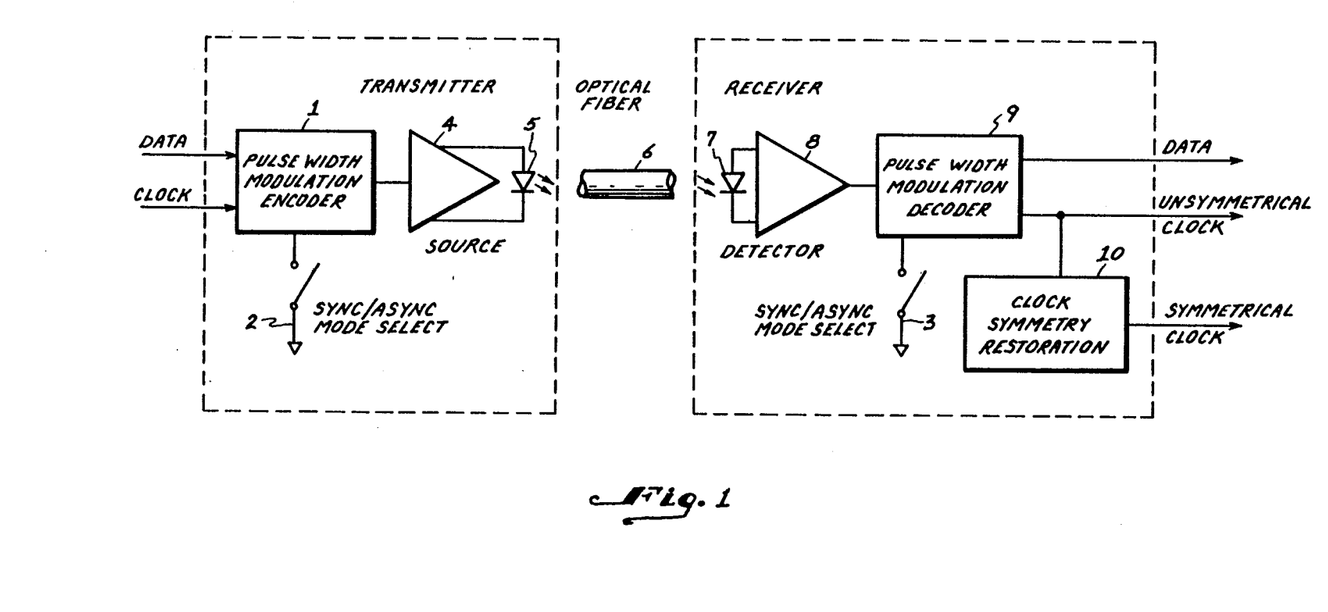
FIG. 1 is a schematic of the fiber optic communications system of the invention.

FIG. 1 shows data and clock signals being input to pulse width modulation encoder 1. Since the presence of data and clock signals indicate that the system is operating in a synchronous mode, switches 2 and 3 are set to the synchronous select position. The encoded signal leaves encoder 1 and is conveyed to transmitter module 4. Transmitter module 4 has light emitting diode 5 connected across its output for converting the signal from an electrical to an optical one. The optical signal is then conveyed through optical fiber 6 to PIN diode 7 where it is reconverted back into an electrical signal and input to receiver module 8. The signal then passes through PWM modulation decoder 9 which contains circuitry for recovering both the data signal and an unsymmetrical clock signal. Clock symmetry restoration circuit 10 has the capability for converting the unsymmetrical clock signal to a symmetrical signal over a wide range of duty factors.

Figure 2:
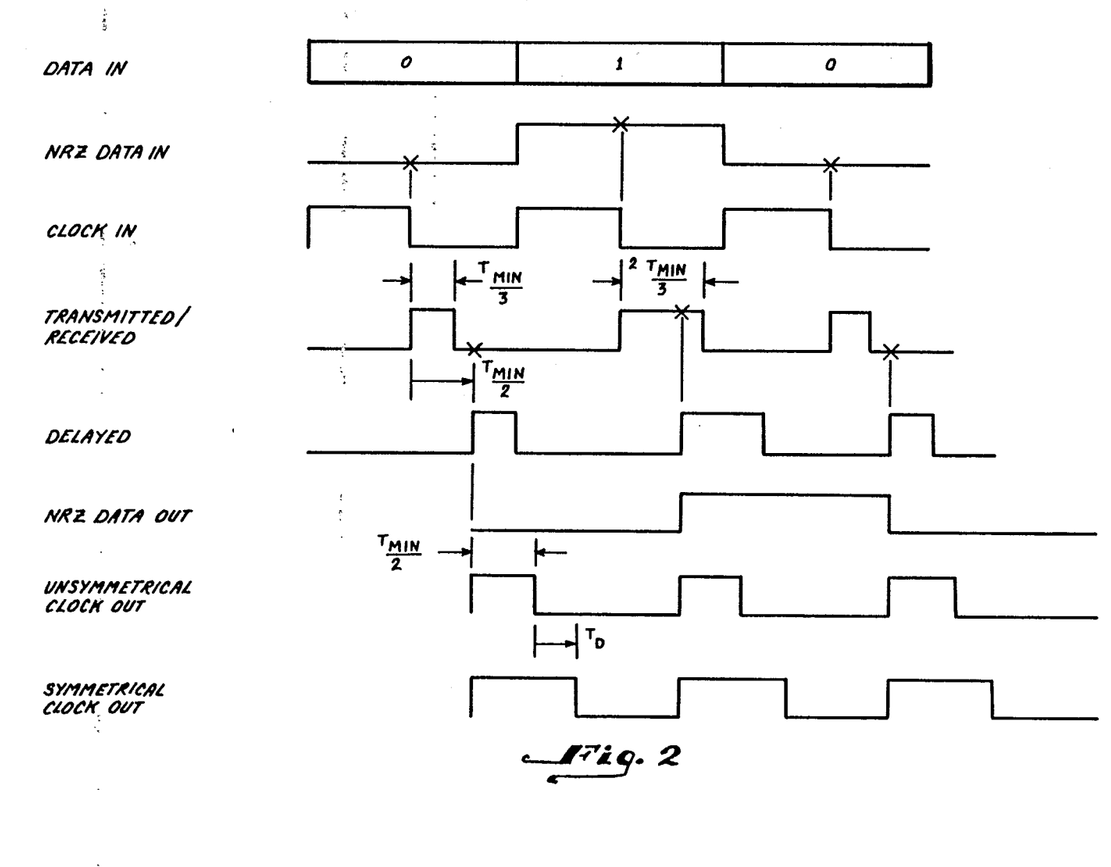
FIG. 2 shows a series of waveforms obtained from the system of FIG. 1.

FIG. 2 illustrates a typical synchronous transmission utilizing the circuitry of FIG. 1. In this figure, the Data In waveform indicates that binary sequence 010 is being transmitted. The non-return to zero(NRZ) binary input is indicated as low-high-low and the clock signal is represented at the square wave whose negative transition occurs in the center of the NRZ bit. Pulse width modulation encoder 1 reads the state of the NRZ data input at the aforementioned negative transition and transmits a pulse whose pulse width is $T_{min}/3$ if a zero is transmitted and $2 T_{min}/3$ if a one is transmitted (or visa versa). Tmin is defined as the mimimum NRZ input bit period that the link must accommodate; i.e., one bit period at the highest data rate. At the receiver end of the system, pulse width modulation decoder 9 recovers data by sampling the receiver waveform with the received waveform being delayed in time by $T_{min}/2$. If a low is detected the received binary symbol is a zero; if a high is detected the symbol is a one. A valid clock signal is recovered simply by generating a positive transition corresponding to the positive edge of the delayed received waveform and the negative transmission $T_{min}/2$ later. The recovered clock signal will be symmetrical if the NRZ data being transmitted has a bit period of Tmin. The clock signal remains valid but becomes unsymmetrical for NRZ bit periods greater than $T_{min}$. To provide a symmetrical clock signal, the negative edge of the unsymmetrical clock signal is extended by $T_D$ such that the negative transition occurs in the center of the bit period.

Summarizing FIG. 2, the Data In waveform shows a 010 binary data input. The NRZ Data In waveform shows a low-high-low sequence corresponding to the 010 data input. The Clock In waveform is a symmetrical square wave whose negative transition occurs in the center of the NRZ bit period. The transmitted/received signal consists of an optical pulse with a width of $T_{min}/3$ being transmitted when the sampling of the negative transition of the clock signal indicates that the data input is zero, and an optical signal whose pulse is 2 $T_{min}/3$ being transmitted when sampling at the negative transition of the clock signal indicates that the data input is one. The delayed waveform indicates that at the receiver end of the system data is recovered by sampling the received waveform with the received waveform being delayed in time by $T_{min}/2$. The unsymmetrical Clock Out waveform discloses the fact that the clock signal obtained from pulse modulation decoder 9 will be unsymmetrical if the NRZ being transmitted has a bit period other than Tmin. The symmetrical Clock Out waveform indicates that the afore-mentioned unsymmetrical waveform can be converted to a symmetrical one by extending the negative edge by $T_D$ such that the negative transition occurs in the center of the bit period.

Asynchronous data is transmitted using the same pulse width format used in the synchronous mode. However, the polarity of transitions occurring in the input signal determine which pulse width is transmitted. A positive transition is indicated by a pulse $T_{min}/3$ wide and a negative pulse is indicated by a pulse $2T_{min}/3$ (or vice versa) where $T_{min}$ is the minimum NRZ bit period in the synchronous transmission mode.

Figure 3:
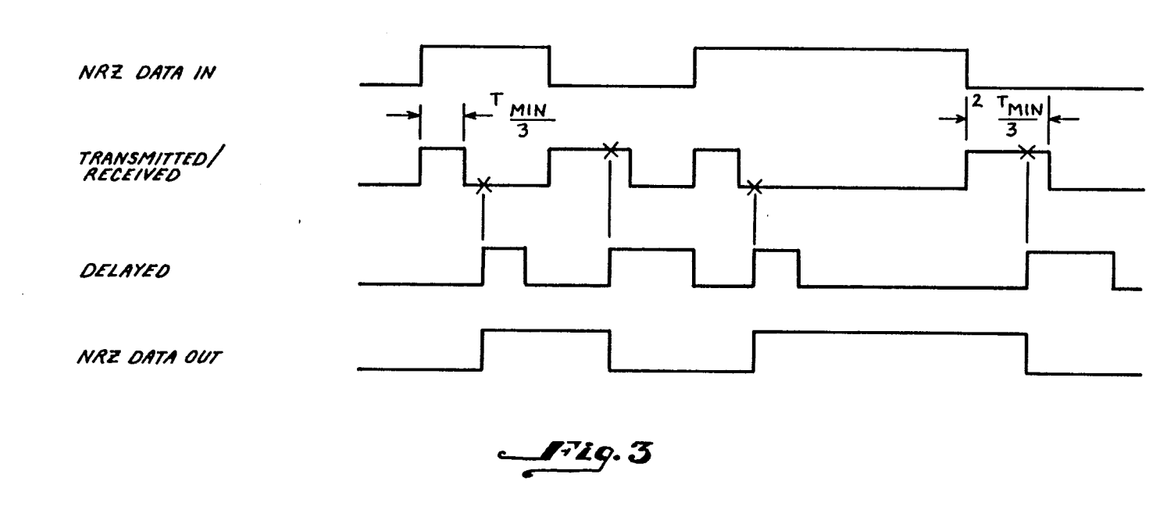
FIG. 3 shows a series of waveforms obtained from asynchronous operation of the system of FIG. 1.

Asynchronous mode waveforms are illustrated in FIG. 3 wherein the transmitted/received waveform consists of a pulse which is being transmitted with each change in state of the NRZ Data In waveform. The input waveform is reconstructed at the receive end by delaying the transmitted/received waveform by $T_{min}/2$ and using the positive transitions of this delayed waveform to sample the state of the transmitted/received waveform. If a low level is detected, a positive transition is generated. If a high level is detected, a negative transition is generated.

A key characteristic of the PWM code is that the encoded bit always begins with a positive transition and always ends in an off state. One advantage of this is that timing information is conveyed only by the positive transitions of the encoded signal. This helps to reduce the effects of systematic signal distortion resulting from unequal propagation delays for positive and negative transitions through the transmitter and receiver. Another advantage of this scheme is that the decoding scheme will work equally well with bursty data of the type encountered in a data bus. Since timing is recovered from each bit, near instantaneous clock recovery is achieved. This assumes, of course, that the transmitter and receiver are suitable for transmitting bursty data.

Figure 4:
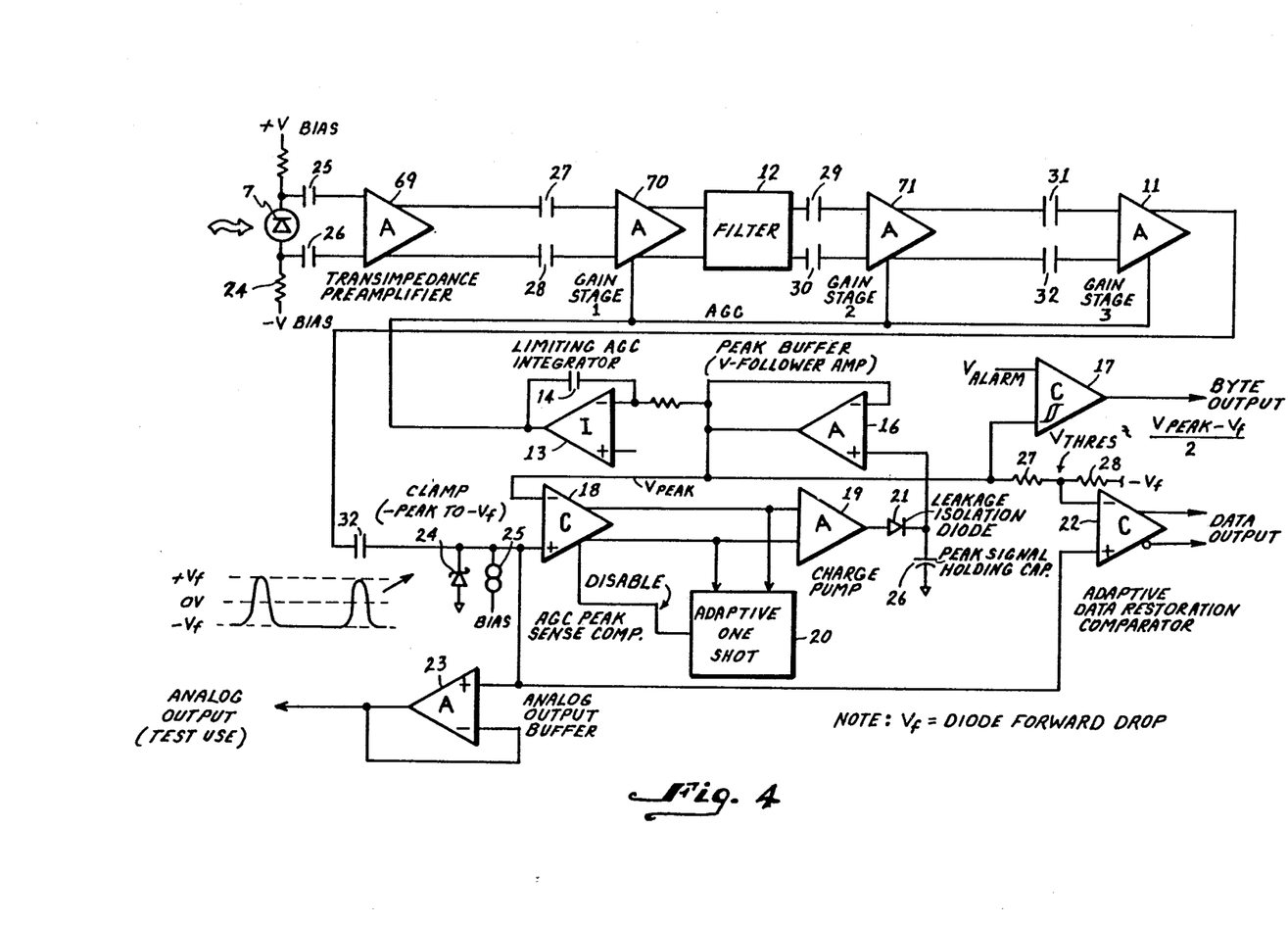
FIG. 4 is a schematic of the receiver circuit of the invention.

FIG. 4 shows the circuit of receiver module 8. In this circuit the incoming pulse encoded optical signal is detected by PIN diode 7 which outputs a current proportional to the optical signal power. The signal is then conveyed to transimpedance preamplifier 69. Preamplifier 69 presents a low impedance to the current signal from diode 7 and functions to produce two balanced voltage signals proportional to the diode current and 180 degrees out of phase with each other. These voltage signals are conducted through coupling capacitors 27 and 28 to amplifier 70 which represents the first gain stage of the circuit. Amplifier 70, as well as amplifiers 71 and 11 used in successive gain stages, is constructed with components such that its outputs are symmetrically balanced.

A balanced amplifier chain was used for two reasons: first, because it provides much better protection against feedback which can cause oscillation, and second, to provide a zero DC bias situation in which to incorporate the automatic gain control components. The three amplifiers, 70, 71 and 11 are basically the same except for the inclusion of filter 12 between amplifier 70 and amplifier 71.

Figure 5:
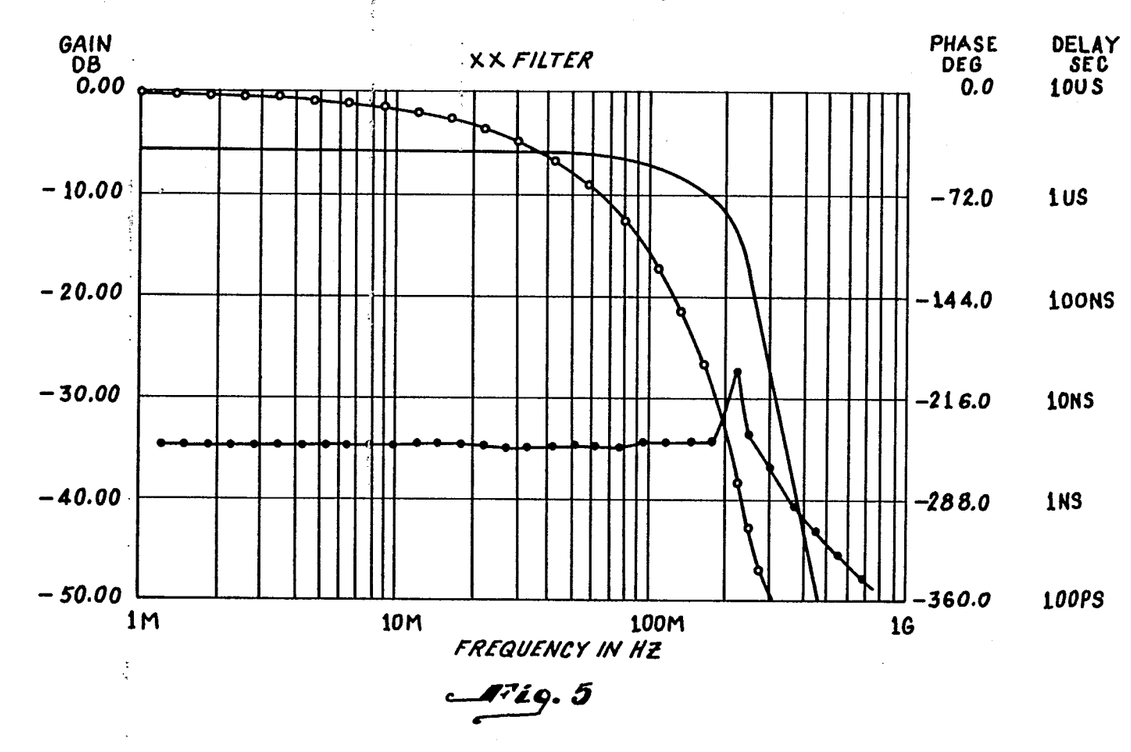
FIG. 5 shows the characteristics of the filter found in the receiver circuit of FIG. 4.

The interstage filter 12 provides a three dB breakpoint at approximately 140 MHz, with a slope of approximately 18 dB per octave. Curves 29, 30 and 31, as shown on the graph of FIG. 5, respectively represent the calculated gain, phase relationship and delay of the filter.

The output signal from the last amplifier 11 is connected into a clamp circuit comprising capacitor 32, Schottky diode 24 and bias resistor 25. The clamp circuit assures that the negative excursions of the signals from amplifier 11 are clamped to approximately −0.4 volts. The peak value of the signal from amplifier 11 is then restricted to approximately +0.4 volts by automatic gain control action.

The aforementioned automatic gain control action is accomplished by a peak-follower circuit comprising comparator 18, adaptive one-shot module 20, amplifier 19 and peak buffer 16. By means of this circuit a voltage is developed at the output of peak buffer 16 which is proportional to the peak signal received from amplifier 11, even if this signal had persisted for only 34 nanoseconds out of 10 milliseconds because of an extremely low duty factor. Limiting AGC integrator 13 compares this voltage with a 0.4 reference voltage, and adjusts the AGC control voltage such that the voltage at the output of peak buffer 16 equals the reference voltage.

Because of the extreme duty factors encountered in the present system, the peak follower circuit shown herein is somewhat unconventional. This circuit accomplishes the time factor stretching discussed in the Background of the Invention. Thus, the clamped incoming pulse from amplifier 11 is compared to the voltage output of the peak buffer 16 in comparator 18. If the incoming pulse is of amplitude less than the voltage output of the peak buffer, no firing of comparator 18 occurs and the level of the output will slowly decay down. However, if the pulse is larger than the voltage output, the comparator fires and through adaptive one-shot module 20, provides an output which drives the clamped latch input of AGC peak comparator 18. This results in a stretching of the input pulses from amplifier 11 which is directly proportional to the amount of time since the last pulse. Thus the effect is to stretch pulses when there has not been a pulse for some time and to provide less stretching when there have been other pulses recently received. This time amplification is necessary to enable the circuit to operate under the extreme duty factors likely to be experienced in the system. On the other hand, a circuit lacking the adaptive one-shot module for the time stretching or contraction of the incoming pulse would require the peak signal holding capacitor 26 to charge at a rate equal to the extreme in variation in duty factor times the rate of discharge. In the present system, this would require capacitor 26 to charge at a rate 25,000 times faster than it is discharged. An added advantage of the present circuit is that it increases AGC stability since it adjusts to the duty factor.

The stretched pulse leaves comparator 18 and is conveyed to amplifier 19 which charges the peak signal holding capacitor 26 through leakage isolation diode 21. This diode eliminates leakage current from the charge pump amplifier 19 reaching the peak signal holding capacitor 26 when the pump is in the off state. The voltage across capacitor 26 is then buffered in peak buffer amplifier 16, the output of which serves as the peak follower circuit output.

The data output signals are derived by a comparator 22 which compares the clamped signal from amplifier 11 to a voltage reference approximately halfway between the 0.4 volt negative peak of the signal and the peak detector output which is equal to the positive peak of the signal. This reference voltage is derived by applying the negative peak clamped voltage to a voltage divider comprising resistors 27 and 28. Thus, the comparator functions to "slice" the data in the middle, even when the automatic gain control goes out of control range on weak or strong signals. Slicing the signal in this way, instead of slicing at zero volts (halfway between −0.4 and +0.4) adds approximately 3 dB to the dynamic range of the receiver. An analog output for test use is also provided by analog output buffer 23.

Additionally, a comparator 17 compares the automatic gain control signal to an adjustable alarm level and provides a digital output signal when the incoming optical signal becomes too weak for reliable operation.

Figure 6:
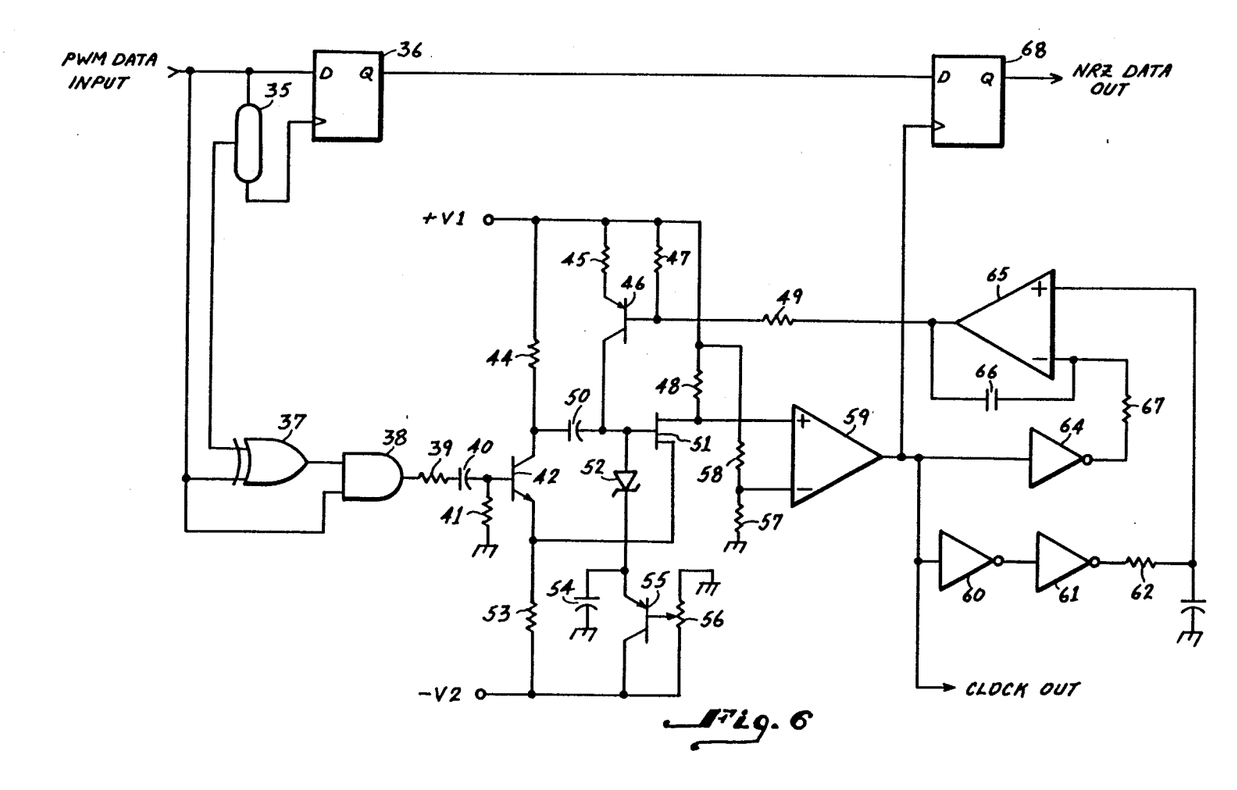
FIG. 6 is a schematic of the clock symmetry restoration circuit of the invention.
Figure 7:
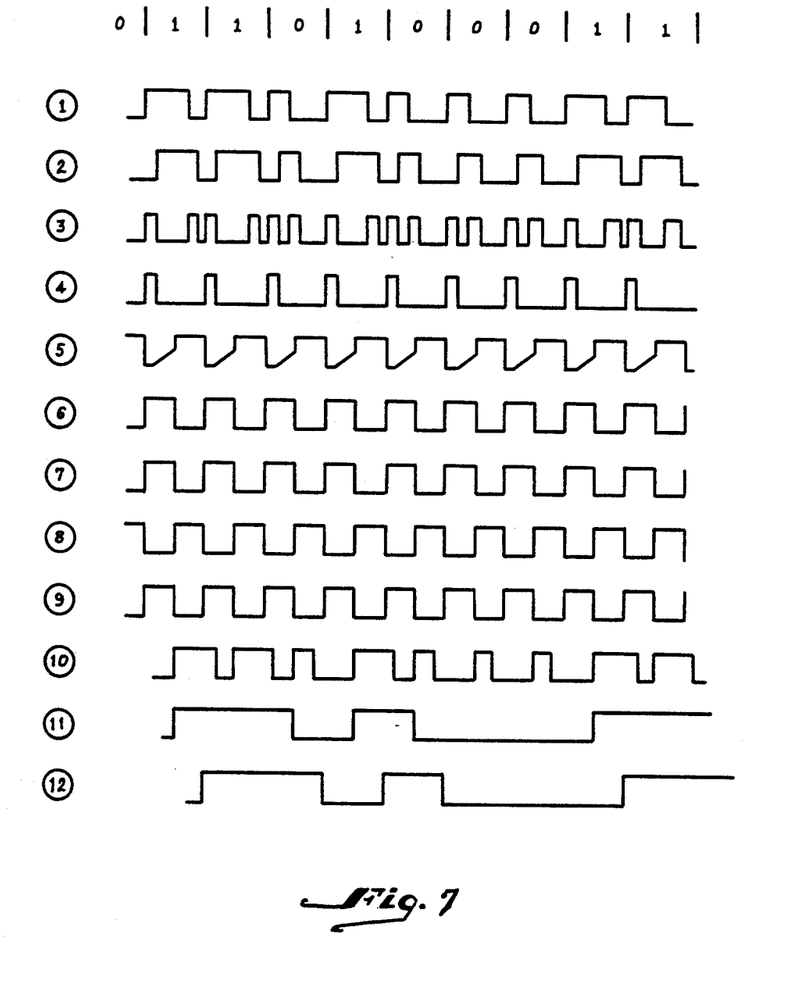
FIG. 7 shows a series of waveforms obtained from the circuit of FIG. 6.

The pulse width modulated data input of FIG. 6 consists of a serial stream of wide pulses representing logic "1" and narrow pulses representing logic "0". This signal is the data output signal from comparator 22 of FIG. 4. The signal feeds a tapped delay line 35 and then it is then conveyed to an exclusive "OR" gate 37. The signal at the tapped output of delay line 35 is a slightly delayed input signal, with the input signal appearing as waveform 1 and the delayed signal appearing as waveform 2 in FIG. 6. Both the delayed signal and the undelayed signal are input to "OR" gate 37. The output of gate 37 is a series of narrow pulses as shown in waveform 3 of FIG. 6. The circuit input data together with the output of gate 37 feed the "AND" gate 38. The output of gate 38 as shown in waveform 4 of FIG. 7, is a series of narrow pulses responding to the positive going transitions of the input pulse width modulated data.

The output of gate 38 is fed via resistor 39 and capacitor 40 to the base of bipolar transistor 42. Resistor 41, also connected to the base of NPN transistor 42 provides a dc current path to properly bias transistor 42. The positive-going edge of the signal at the base of transistor 42 causes transistor 42 to turn on, drawing current through its collector-emitter path. The current flow produces a voltage drop across resistor 44 which lowers the voltage on capacitor 50. The output of capacitor 50 lowers the voltage on the gate of the field-effect transistor 51. The increasing current through the emitter of transistor 42 also raises the voltage on the current source resistor 53, and diverts current from the source of FET 51. Resistor 53 could alternatively be replaced by a transistor configured as a constant current source, or by a constant current diode.

The decreasing voltage on the gate of FET 51 and the increasing voltage on the source of FET 51 act in concert to begin turning FET 51 off. The decreasing current through FET 51 diverts even more current to transistor 42, creating a regenerative effect which rapidly switches transistor 42 fully on and transistor 51 fully off. Transistor 46, connected as a constant current source, feeds current to begin charging capacitor 50. The magnitude of the constant current from transistor 46 is determined by the voltage established at the base of transistor 46 and by the magnitude of the emitter resistance 45. Thus, the rate at which capacitor 50 charges is determined by the voltage at the base of transistor 46.

When the voltage at the gate of capacitor 50 becomes sufficiently high to cause FET 51 to begin drawing current, FET 51 diverts current from the emitter of transistor 42. The decreased current causes an increasing voltage on the collector of transistor 42. This voltage change is coupled via capacitor 50 to the gate of FET 51, producing a regenerative effect which rapidly turns FET 51 fully on and turns transistor 42 fully off. Schottky diode 52 provides a current path to rapidly discharge C2 during this portion of the switching cycle. The voltage on the gate of FET 51 is shown in waveform 5 of FIG. 6. Transistor 55 and capacitor 54 form a voltage source which reverse biases diode 52 when FET 51 is off and forward biases diode 52 when FET 51 is on. The voltage on the cathode of diode 52 is adjustable via the potentiometer 56, connected to the base of transistor 55. The adjustment is necessary to compensate for variation in the pinchoff voltage of individual field effect transistors at 51. This adjustment is made only once during alignment for each unit built.

Transistors 42, 51 and associated components form a monostable multivibrator (one-shot) whose output pulse width is a function of the control voltage at the base of transistor 46. Transistor 42 is chosen to be a bipolar transistor because its high transconductance promotes strong regenerative action with FET 51. Transistor 51 is chosen to be a field effect transistor because its low gate current does not shunt charging current away from 50. If FET 51 were a bipolar transistor, the one-shot pulse width would be difficult to control at low data speeds (wide pulse widths). The current source transistor 46 may be either a bipolar transistor or a field effect transistor.

The output pulse stream from the one-shot is shown as waveform 6. This signal is converted to a digital signal with standard logic levels by the action of comparator 59. The reference input of comparator 59 is set to a voltage midway between the on and off voltages at the drain of FET 51 by the series resistor combination 58 and 57. The output signal of comparator 59 is the recovered clock, waveform 7 of FIG. 6. The clock signal is inverted via inverters 64 and 60 to form waveform 8 of FIG. 6. The signal is reinverted via inverter 61 to form waveform 9 of FIG. 6. Inverters 64 and 61 are located on the same chip, to insure that their high levels, low levels, and transition times are very nearly equal. This precaution guarantees that waveforms 8 and 9 are very nearly perfect complements of one another, which in turn guarantees that the recovered clock duty cycle will be very nearly 50%.

The output of inverter 61 is fed to a low pass filter made up of resistor 62 and capacitor 63. The low pass filter converts the waveform at the output of inverter 61 into its dc average value, to be used as the reference signal for the integrator. The complementary clock signal at the output of inverter 64 drives the integrator made up of operational amplifier 65, input resistor 67, and feedback capacitor 66. The output of the integrator is a slowly-varying dc signal whose rate of change is proportional to the difference between the dc-average values of the clock and complementary clock signals. Only when the clock (and complementary clock) have 50% duty cycles will the output of the integrator stabilize at a fixed dc voltage. For instance, if the clock is 60% duty cycle, the complementary clock is 40% duty cycle and the output voltage of the integrator will increase.

The integrator output is fed through resistor 49 to the base of transistor 46 where it in conjunction with the one-shot form a closed control loop which attempts to stabilize the clock output at 50% duty cycle regardless of the input data rate. The maximum data rate is limited by the tap position on delay line 35, the switching speed of transistors 42 and 51, the maximum current that transistor 46 can deliver and diode 52 can sink, and the time constant of the resistor 44 capacitor 50 combination. The minimum data rate is limited by the magnitudes of leakage currents in the collector of transistor 46, the gate of FET 51, and diode 52. These leakage currents can establish spurious charging paths for capacitor 50 which are uncontrolled by the integrator. In practice, the practical range of data rates from which a 50% duty cycle clock can be recovered can span 17 octaves or more.

Having regenerated the clock, the coincident data is regenerated by the action of D-type flip-flops 36 and 68. Flip-flop 36 regenerates the NRZ data by clocking the PWM input data with the delayed output of delay line 35 shown in waveform 10 of FIG. 6. The delay through delay line 35 is chosen to equal the halfway value between the wide and narrow pulse widths, so that only wide pulses will be clocked to the output of the flip-flop. The output of flip-flop 36 is the recovered NRZ data shown in waveform 11 of FIG. 6. The NRZ data is aligned with the recovered clock by the action of flip-flop 68. The recovered and properly aligned NRZ data is shown in waveform 12 of FIG. 7.

While we have described above the principles of our invention in connection with specific apparatus, it is to be clearly understood that this description is made only by way of example and not as a limitation to the scope of our invention as set forth in the objects thereof and in the accompanying claims.

We claim:

1. A circuit for receiving pulse width modulated data signals in an optical fiber communications system comprising:
    means for amplifying a pulse width modulated signal;
    means for comparing the amplified pulse width modulated signal with a reference quantity and
    means connected to said pulse amplifying means for limiting the peak value of the amplified pulse width modulated signal, said limiting means including means connected to an output of said comparing means for adjusting the duty cycle of the amplified pulse width modulated signal.

2. The circuit of claim 1, wherein said means for adjusting the duty cycle comprise a one shot module and said means for limiting further comprises:
    a charge pump amplifier having an input connected to an output of said means for comparing; and
    a limiting automatic gain control integrator having an input connected to said means for comparing and an output connected to said means for amplifying.

3. The circuit of claim 2, wherein said means for limiting further comprises:
    a peak buffer amplifier having an input connected to an output of said charge pump amplifier, an output connected to an input of said limiting automatic gain control integrator, and an output connected to an input of said means for comapring.

4. The circuit of claim 3, wherein said means for amplifying comprise:
    a transimpedance amplifier which converts a single pulse width modulated signal to a dual output signal in which the dual outputs are essentially equal in amplitude, but 180 degrees out of phase;
    a plurality of amplifiers connected in series with each other and with the dual outputs of said transimpedance amplifier; and
    an interstage low pass filter connected in series with said plurality of amplifiers.

5. The circuit of claim 3, wherein said means for limiting further comprise a leakage isolation diode whose cathode is connected to an output of said charge pump amplifier and whose anode is connected to an input of said peak buffer amplifier, and a peak signal holding capacitor connected to the anode of said leakage isolation diode.

6. The circuit of claim 4, wherein said means for limiting further comprise a leakage isolation diode whose cathode is connected to an output of said charge pump amplifier and whose anode is connected to an input of said peak buffer amplifier, and a peak signal holding capacitor connected to the anode of said leakage isolation diode.

7. The circuit of claim 1, wherein said means for amplifying comprises:
    a transimpedance amplifier which converts a single pulse width modulated signal to a dual output signal in which the dual outputs are essentially equal in amplitude, but 180 degrees out of phase;
    a plurality of amplifiers connected in series with each other and with the dual outputs of said transimpedance amplifier; and
    an interstage low pass filter connected in series with said plurality of amplifiers.

8. The circuit of claim 1 wherein said means for limiting further comprise automatic gain control means including means for adjusting the gain of the automatic gain control means to restrict the peak voltage to be substantially equal to a reference voltage.

9. The circuit of claim 1 wherein said means for adjusting the duty cycle include means for adjusting the duty cycle of a received pulse in accordance with the time elapsed since a previous received pulse.

* * * * *